No. 770,220. PATENTED SEPT. 13, 1904.
F. B. CASE.
LENS CARRIAGE CLAMP FOR PHOTOGRAPHIC CAMERAS.
APPLICATION FILED FEB. 4, 1904.
NO MODEL.
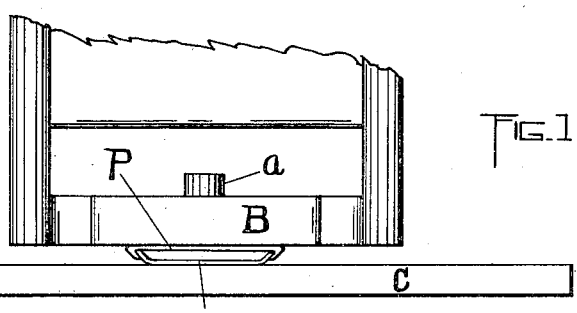
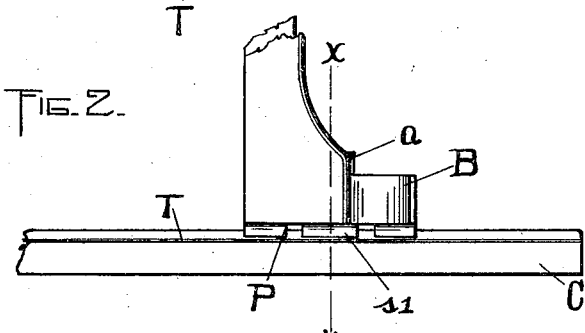
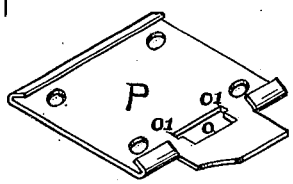
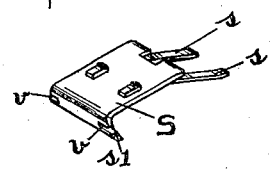
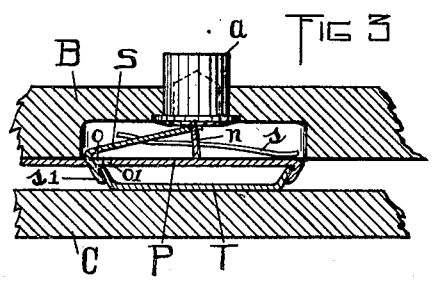
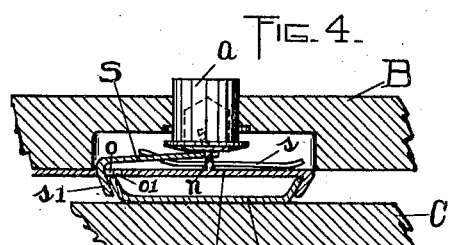
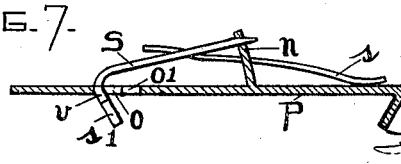
WITNESSES:
INVENTOR:
Frank B. Case
by Wm. H. Cowley
Atty.

No. 770,220. Patented September 13, 1904.

UNITED STATES PATENT OFFICE.

FRANK B. CASE, OF ROCHESTER, NEW YORK, ASSIGNOR TO SENECA CAMERA COMPANY, OF ROCHESTER, NEW YORK, A CORPORATION OF NEW YORK.

LENS-CARRIAGE CLAMP FOR PHOTOGRAPHIC CAMERAS.

SPECIFICATION forming part of Letters Patent No. 770,220, dated September 13, 1904.

Application filed February 4, 1904. Serial No. 191,989. (No model.)

*To all whom it may concern:*

Be it known that I, FRANK B. CASE, a citizen of the United States, and a resident of Rochester, in the county of Monroe and State of New York, have invented an Improved Lens-Carriage Clamp for Photographic Cameras, of which the following is a specification.

This invention relates to a mechanism for clamping the lens-carriage of a photographic camera in any desired position of longitudinal adjustment upon its bed-plate. Such mechanisms as usually constructed have necessitated the use of the thumb and one of the fingers of the hand of the operator, and the size of the parts for the smaller cameras is usually such that there is little room afforded for the thumb and finger of the operator to secure a proper hold of the operating device. These difficulties I have overcome by providing a mechanism such that the downward pressure thereon of either a finger or thumb of the operator serves to release the locking mechanism between the lens-carriage and the camera-bed, and a pressure exerted at the same time and upon the same device in either direction longitudinally of the bed serves to slide such lens-carriage backward or forward on such bed to the desired position of adjustment thereon, and by the release of such pressure the lens-carriage is instantaneously locked in that position.

The accompanying drawings show only such parts of a camera-bed and lens-carriage as are necessary to illustrate my invention as embodied therein.

Such drawings are as follows: Figure 1 is a front view of a lens-carriage and bed with bed-plate attached and with my locking mechanism for securing the parts. Fig. 2 is a side view of the parts seen in Fig. 1. Fig. 3 is a vertical sectional view of the parts seen in Figs. 1 and 2, taken along the dotted line *x y* of Fig. 2 and showing the parts in the positions they assume when locked and with the push-button shown in full. Fig. 4 is a view similar to Fig. 3, but with the parts shown in the positions they assume when unlocked. Fig. 5 is a perspective view of the plate P secured to the under side of the bed-piece B of the camera-front and turned bottom side up. Fig. 6 is a perspective view of the clamping-plate S of my device. Fig. 7 shows the clamping-plate S and its operating-springs *s* in full lines and with the plate P shown in sectional view for the purpose of more clearly indicating the opening therein for the insertion and removal of the plate S.

Similar letters refer to similar parts throughout the several views.

Referring to the drawings, C is the bed of the camera, and T the bed-plate, having its edges bent up obliquely to form guides to coöperate with the turned-down edges *p* of the plate P, secured upon the under side of the base B of the camera-front. This plate P has an opening therein, *o*, and notches *o'* extending this opening *o* in directions longitudinally of the bed-plate T. The plate S has bent thereon the clamping portion *s'*, as indicated in Fig. 6. This plate S is of such a width that it may be inserted through the opening *o* at the notches *o'* therein, and then it may be forced outwardly by reason of the notches *v*, seen in this plate S, which permit of its being thus moved outwardly, so as to be held against removal at the extreme outer edge of the opening *o*. Springs *s*, inserted through openings therefor in the plate S and bearing upon the upper surface of the plate P, serve to raise the right-hand or free end of the plate S as far as permitted by the other elements of my device to be described. Projecting upwardly from the plate P is seen a guide-plate *n*, arranged to engage the notch in the free and right-hand end of the plate S and prevent the removal to the right of such plate S when the upper and free end of such plate S is held down far enough so as to be engaged by this guide-plate *n*. The bed-piece B of the camera-front is recessed on its under side just enough to permit the free end of the plate S to rise far enough to cause the clamping end *s'* thereof to firmly engage the left-hand side of the bed-plate T. Through a suitable opening in the upper side of this bed-piece B there projects a push-button *a*, arranged to freely work vertically through such opening therefor. This button $a$ is bored out on its under side, so that when forced downwardly it passes over the guide-plate $n$, and by engaging the upper and free end of the clamping-plate S on each side of the notch therein for this guide-plate $n$ it forces the free end of such plate S downwardly, causing the clamping end $s'$ thereof to be disengaged from the bed-plate T. When this button $a$ is thus forced downwardly, the camera-front is unlocked from the camera bed-plate T, and by pushing horizontally upon the button $a$, as well as downwardly, the camera-front may be moved in either direction longitudinally upon the bed-plate T, and then by releasing the finger or thumb from the push-button $a$ the parts assume the position indicated in Figs. 1, 2, and 3, firmly locking the camera-front in the desired position of longitudinal adjustment on the bed-plate T.

What I claim is—

1. In a photographic camera, a camera-bed, a guideway on such bed, a camera element arranged to work on such bed, a guide-plate secured to such camera element and arranged to engage such guideway and slide freely thereon, a clamping-plate, a spring for normally holding such clamping-plate in engagement with such guideway, a handle for opposing the action of such spring and means for supporting such handle whereby the same may be engaged by the hand of the operator for opposing such spring and for adjusting such camera element on such bed, such clamping-plate and guide-plate articulating together by means of coöperating openings and notches therein whereby such clamping-plate is normally retained against removal from such guide-plate when such guide-plate is in engagement with such guideway.

2. In a photographic camera, a camera-bed, a guideway on such bed, a camera element arranged to work on such bed, a guide-plate secured to such camera element and arranged to engage such guideway and slide freely thereon, a clamping-plate, a spring for normally holding such clamping-plate in engagement with such guideway, a handle for opposing the action of such spring and means for supporting such handle, such clamping-plate and guide-plate articulating together by means of coöperating openings and notches therein whereby such clamping-plate is normally retained against removal from such guide-plate when such guide-plate is in engagement with such guideway.

FRANK B. CASE.

Witnesses:
CLARA M. LIENER,
OSBORNE F. GURNEY.